US005495908A

United States Patent [19]
Obara et al.

[11] Patent Number: 5,495,908
[45] Date of Patent: Mar. 5, 1996

[54] ELECTRIC CAR CONTROL SYSTEM

[75] Inventors: Sanshiro Obara, Ibaraki; Hiroyuki Yamada; Shigeyuki Yoshihara, both of Katsuta; Nobunori Matsudaira, Hitachi, all of Japan

[73] Assignees: Hitachi, Ltd., Tokyo; Hitachi Automotive Engineering Co., Ltd., Ibaraki, both of Japan

[21] Appl. No.: 131,607

[22] Filed: Oct. 5, 1993

[30] Foreign Application Priority Data

Oct. 6, 1992 [JP] Japan ................................. 4-267051

[51] Int. Cl.$^6$ .............................. B60K 1/00; B60L 15/02
[52] U.S. Cl. .................... 180/65.8; 180/65.1; 318/139
[58] Field of Search .......................... 180/65.1, 65.8; 318/139, 254, 293, 434; 361/30; 388/907.5

[56] References Cited

U.S. PATENT DOCUMENTS

| | | | |
|---|---|---|---|
| 4,680,513 | 7/1987 | Kennedy | 318/293 X |
| 5,065,320 | 11/1991 | Hayashi et al. | 180/65.8 X |
| 5,166,584 | 11/1992 | Fukino et al. | 318/139 |
| 5,251,680 | 10/1993 | Minezawa et al. | 180/65.8 X |
| 5,280,223 | 1/1994 | Grabowski et al. | 318/139 |

FOREIGN PATENT DOCUMENTS

| | | | |
|---|---|---|---|
| 1480652 | 6/1969 | Germany | 180/65.8 |
| 53-46646 | 8/1978 | Japan . | |

Primary Examiner—Brian L. Johnson
Attorney, Agent, or Firm—Evenson, McKeown, Edwards & Lenahan

[57] ABSTRACT

A control system for an electric car includes a motor connected to a battery as a main power source for driving the electric car, a strong electricity unit having high voltage devices including an inverter for driving the motor based on power supplied thereto from the battery, a weak electricity unit having low voltage circuits including a microcomputer for data processing, and connection devices for connecting the strong and weak electricity units in such a relationship that a signal path is connected between the units as electrically isolated therefrom, wherein signal transmission between the strong and weak electricity units is carried out with use of the signals isolated between the units.

12 Claims, 4 Drawing Sheets

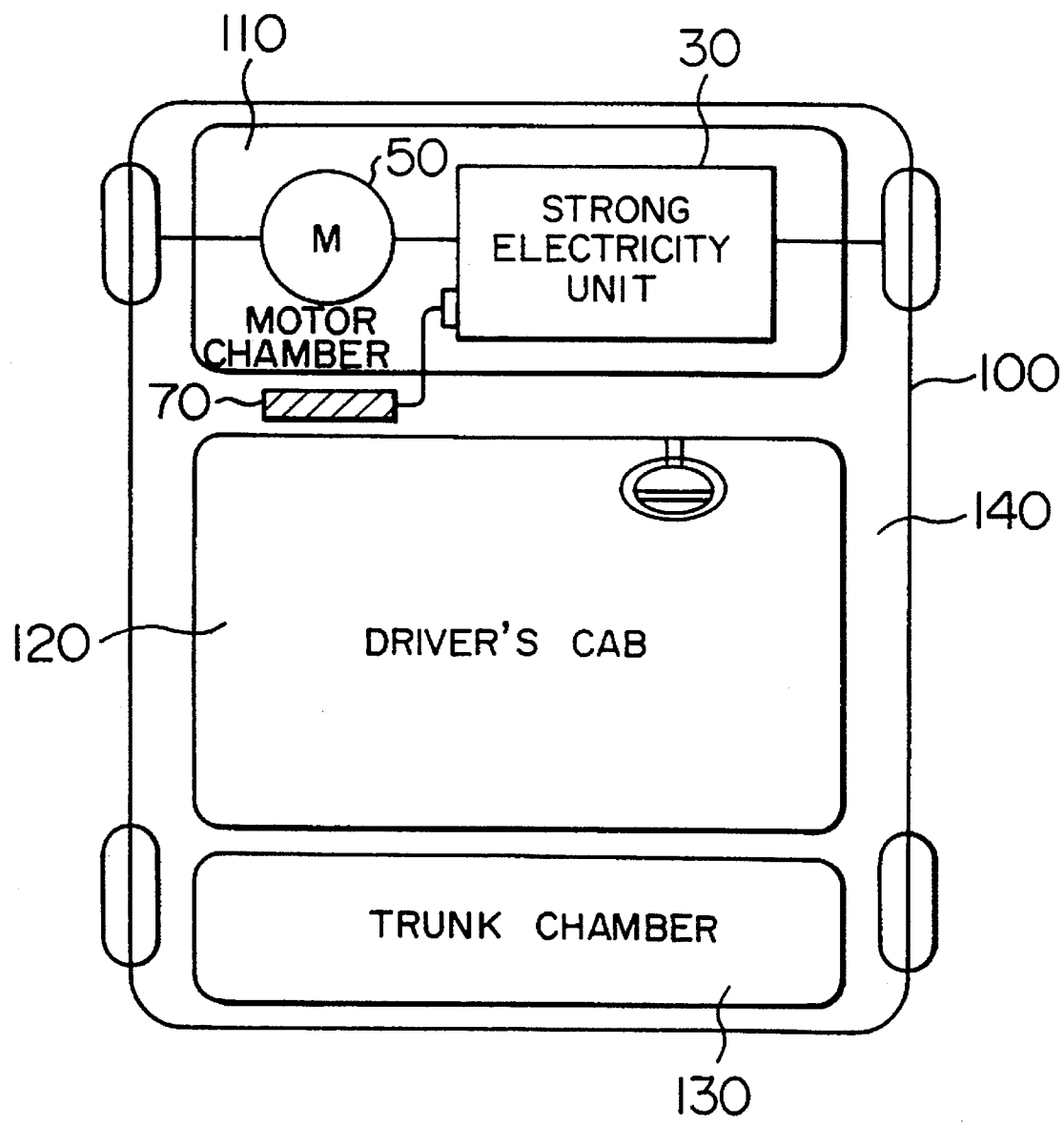

ELECTRIC CAR CONTROL SYSTEM

BACKGROUND OF THE INVENTION

1. Field of the Invention

The present invention relates to a system for controlling an electric car which uses a battery as its main power source.

2. Description of the Related Art

An electric car, as disclosed in JU-B-5346646, is arranged so that a power converter (inverter or chopper circuit) for driving an electric motor and its control circuit are integrally formed for miniaturization and space saving.

SUMMARY OF THE INVENTION

In an electric car or vehicle, for example, in an electric automobile using a battery as its main power source; for the purpose of extending a distance capable of running per one charge operation and shortening an accelerating/decelerating time, the voltage of the battery is made higher and the capacity of an electric motor is made larger. To this end, it is necessary to enhance resistance to the noise of a control circuit based on a microcomputer as its main component and to accommodate a power converter tending to be larger in size into a limited space of the body of the electric car.

It is an object of the present invention to provide a control system for an electric car which can be high in resistance to noise and can be effectively accommodated in a car body.

According to an aspect of the present invention, there is provided a control system for an electric car which comprises a motor connected to a battery as a main power source for driving the electric car, a strong electricity unit having high voltage devices including an inverter for driving the motor based on power supplied thereto from the battery, a weak electricity unit having low voltage circuits including a microcomputer for data processing, and connection devices for connecting the strong and weak electricity units in such a relationship that an electrically isolated signal path is connected between the units wherein signal transmission between the strong and weak electricity units is carried out with use of the signals isolated between the units.

In this way, since the strong and weak electricity units are connected to each other through a signal path in an electrically isolated relationship, signal transmission between the units can be carried out with use of signals electrically isolated between the units and thus the resistance of the control system to noise can be improved.

According to an example of the present invention, the control system further comprises casings which house the above strong and weak electricity units respectively separately.

Therefore, in this case, the strong electricity unit can be electrically separated from the weak electricity unit and thus the resistance of the microcomputer to noise can be increased.

According to the example of the present invention, the weak electricity unit is made up of such low voltage circuits, a microcomputer for performing data processing operation to control the motor and a drive signal generation circuit for generating a drive signal for the inverter.

In this way, the weak electricity unit is made up of exclusively low-voltage signal processing circuits including the drive signal generation circuit for generating the drive signal for the inverter on the basis of the arithmetic result of the microcomputer for control of the motor.

In the example of the present invention, further, the strong electricity unit is made up of such high voltage devices, a inverter having a power switching elements, inverter driving circuits for driving the power switching elements, current/voltage detectors, a detection value processor circuit for processing detection values of the detectors, an abnormality detection circuit for detecting an abnormality in the inverter on the basis of the detection values, and processing circuits therefor.

Further, since the strong electricity unit converts the current/voltage detection values into pulse signals, signal transmission from the strong electricity unit to the weak electricity unit can be facilitated.

In the example of the invention, the detection value processor circuit of the strong electricity unit includes a voltage/frequency converter which converts the current/voltage detection values into pulse signals.

In the above case, further, each of the strong and weak electricity units contains an optical transmission circuit and interconnection between the units are carried out by means of an optical transmission line.

Furthermore, in the control system, the strong electricity unit is disposed close to the motor in a front and/or rear part of the electric car; while the weak electricity unit is housed in a space in front of and/or at the back of and/or at a side of a driver's cab.

BRIEF DESCRIPTION OF THE DRAWINGS

FIG. 4 is an exemplary array of the control system of the embodiment of FIG. 1 arranged within the electric car.

DESCRIPTION OF THE PREFERRED EMBODIMENTS

Figure 1:
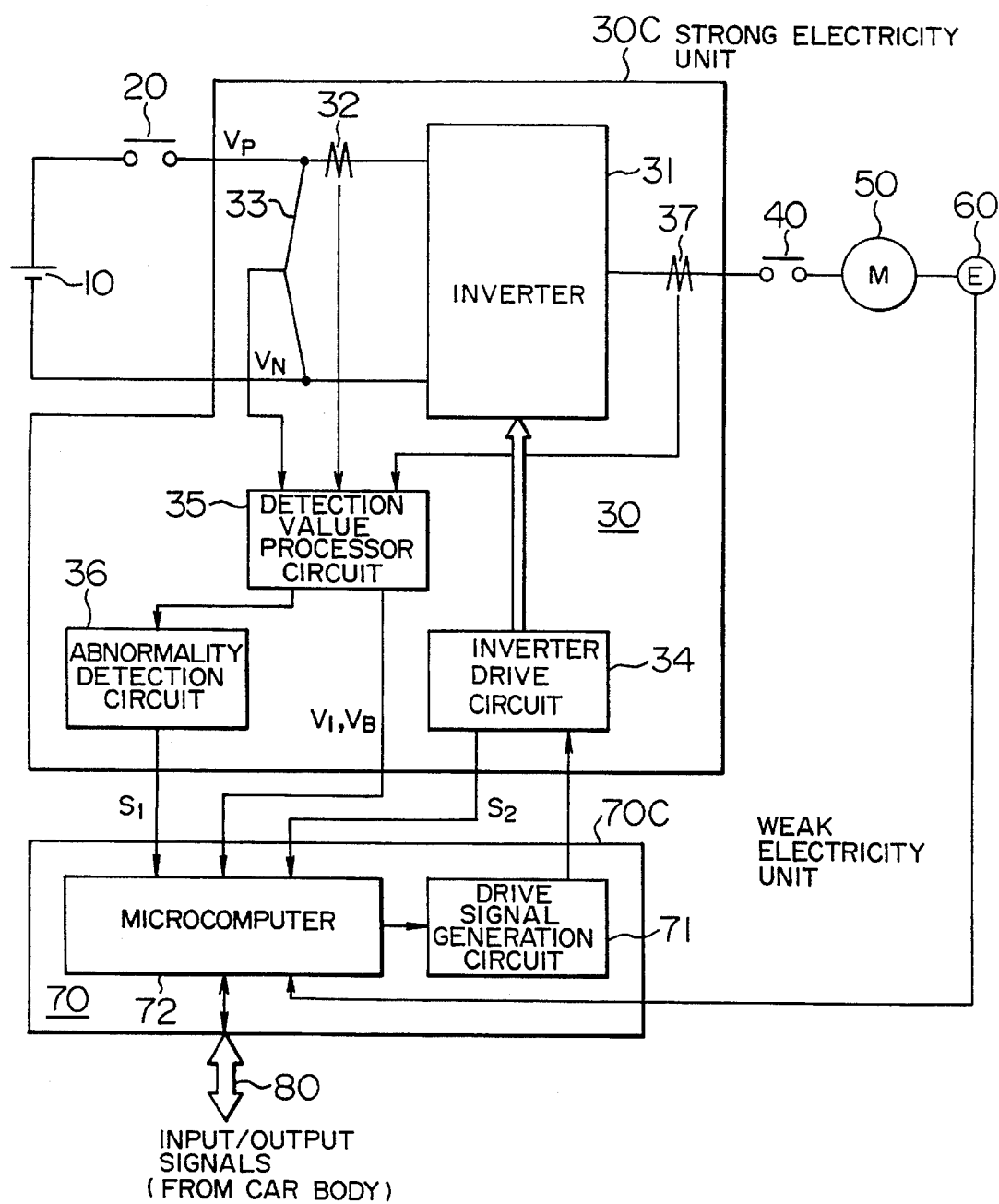
FIG. 1 is a block diagram of an arrangement of a system for controlling an electric car in accordance with an embodiment of the present invention.

A system for controlling an electric car in accordance with an embodiment of the present invention will be explained with reference to FIG. 1 showing a block diagram thereof.

In FIG. 1, an illustrated control system includes a battery 10 as a main power source of an electric car, a main contactor 20, a strong electricity unit 30 having an inverter 31 as a high voltage device therein as a main constituent component, another contactor 40, an electric motor 50, an encoder 60 for detecting a rotational speed of the motor 50, a weak electricity unit 70 having a microcomputer as a low voltage circuit therein as its main constituent component, and an input/output signal 80 received or supplied from or to the body of the electric car. In more detail, the strong electricity unit 30 has the aforementioned inverter 31 for converting a DC signal into an AC signal using power switching elements, a current detector 32, a voltage detector 33, inverter driving circuit 34 for driving the power switching elements of the inverter 31, a detection value processing circuit 35 for processing detection values received from the current detectors 32, 37 and the voltage detector 33, and an abnormality detection circuit 36 for detecting an abnormality in these detectors on the basis of an output value of the detection value processing circuit 35. Meanwhile, the weak electricity unit 70 has a drive signal generation circuit 71 for generating a drive signal for the inverter 31, and a microcomputer 72 for executing arithmetic operation to generate the drive signal of the inverter 31 on the basis of the input/output signal 80 received from the car body.

In the control system of the present invention, the inverter 31 based on a DC power supplied from the battery 10 through the main contactor 20 converts the DC drive voltage signal received from the weak electricity unit 70 into an AC voltage signal. The inverter 31 supplies the converted AC voltage to the motor 50 via the contactor 40.

On the basis of the detection values of input current and voltage of the inverter 31 based on the detectors 32 and 33 and the detection value of a current to the motor 50 based on the detector 37 received from the detection value processing circuit 35 as well as a rotational speed signal of the motor 50 received from the encoder 60; the microcomputer 72 performs its arithmetic operation and the drive signal generation circuit 71 generates a drive signal based on an arithmetic result received from the microcomputer and supplies the drive signal to the circuit 34, thus controllably driving the motor 50.

For the purpose of realizing fail-safe control over the electric car based on the weak electricity unit 70, the abnormality detection circuit 36 for detecting an abnormality in the strong electricity unit 30 is necessary.

In the recent tendency of the electric car control system, the capacity of the motor 50 has been increased (to the order of several tens of kW) and the voltage of the battery 10 has also been increased (to the order of about 300 V). Further, for each of the power switching elements of the inverter 31, an insulated gate bipolar transistor (IGBT) is used for controlling the high voltage power on a pulse width modulation (PWM) based on the switching operation having a switching frequency of several tens of kHz. For this reason, a current containing a high frequency pulsatory signal flows through the motor 50, for which reason it is necessary to take some measure of making the weak electricity unit 70 for processing a low voltage signal resistive to noise.

In accordance with the control system of the present invention, since the strong electricity unit 30 and the weak electricity unit 70 are separately housed in respectively different casings 30c and 70c, a resistance to noise can be enhanced. In this case, these casings are made of a metallic material having a magnetic shielding effect. Further, with respect to signal lines wired between the strong and weak electricity units 30 and 70, in order to avoid signals having high voltage potential from being sent from the strong electricity unit 30 to the lines, such signals are converted into fully-isolated low-voltage signals and then supplied to the signal lines.

Figure 2:
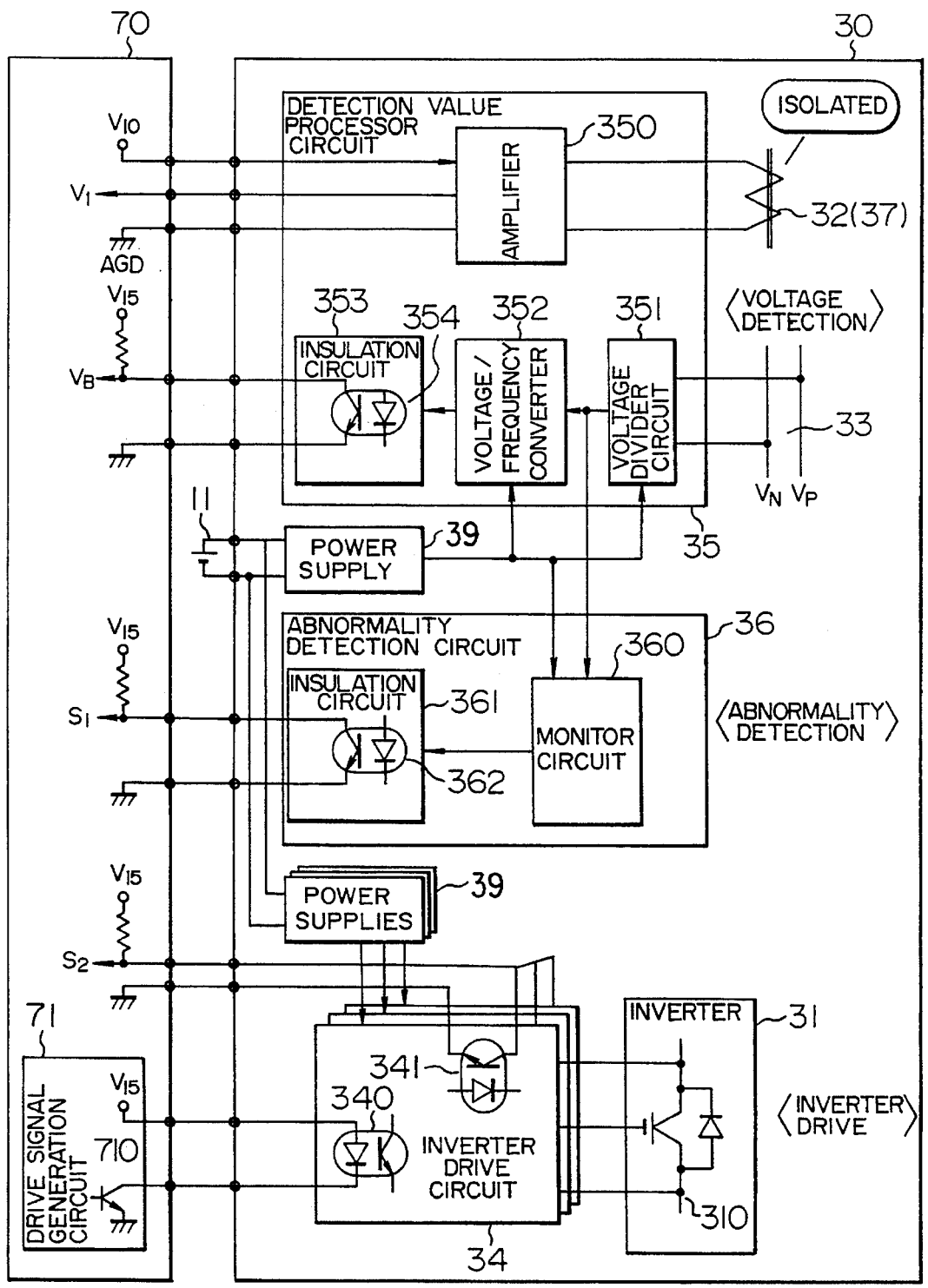
FIG. 2 is a block diagram showing an interconnection relationship between strong and weak electricity units in the control system of the embodiment of FIG. 1.

FIG. 2 is a wiring diagram between the strong and weak electricity units 30 and 70, showing operational signals such as, for an example, current and voltage detection signals, an abnormality detection signal and an inverter drive signal. The operational signals also include a temperature sensor signal which is not illustrated in the drawing, because the sensor itself is provided with an isolating measure.

The detector 32 for detection of the current detection signal is of such a type that the detector is mounted to extend through a wiring line and the detector itself (based on a Hall effect element) has an insulating structure, so that, when the detector 32 is connected to the weak electricity unit 70 through an amplifier 350, the weak electricity unit 70 can obtain a detection signal Vi. The structure of the detector 37 is also substantially the same as the detector 32, i.e., as shown by the same pattern as the detector 32 in the interior configuration of the detection value processing circuit 35, and thus explanation thereof will be omitted.

The voltage detection signal is detected by the voltage detector 33 directly from high voltage terminals VP and VN provided at the input side of the inverter 31, so that, when the detector 33 is connected to the weak electricity unit 70 via a voltage divider circuit 351 having a resistor and so on, a voltage/frequency converter 352, an insulating circuit 353 comprising a photocoupler element 354, and a transmission line; the weak electricity unit 70 can obtain a detection signal VB, for example, as a pulse signal appearing on a pull-up resistor. In this case, the voltage/frequency converter 352 acts to convert an input signal into, e.g., a pulse signal corresponding to the detection voltage value.

With regard to the abnormality detection signal (e.g., excessive voltage detection signal), the abnormality detection circuit 36 has a monitor circuit 360 and an insulating circuit 361 comprising a photocoupler element 362. The monitor circuit 360 monitors the signal of the voltage divider circuit 351 in such a manner that, when an excessive voltage takes place, an abnormality signal is applied, e.g., as a pulse signal to the weak electricity unit 70 via the insulating circuit 361 and a signal line, whereby the weak electricity unit 70 can obtain a detection signal S1 appearing on a pull-up resistor.

In this conjunction, high-voltage power of the voltage divider circuit 351, voltage/frequency converter 352 and monitor circuit 360 is supplied from a small capacity of battery 11 for control circuits provided separately from the battery 10 through a power supply (for example, switching power supply) 39 of a type which converts DC power into DC power.

A drive signal to the inverter 31 is supplied from an associated one of drive elements 710 of the drive signal generation circuit 71 through a photocoupler 340 of associated one of the inverter drive circuits 34 to associated one of power switching elements 310 of the inverter 31 to drive the associated element 310. One of the inverter drive circuits 34 is provided for one of the power switching elements 310. Further, an excessive current protection signal S2 for detection of an excessive current in the power switching elements 310 of the inverter drive circuits 34 is connected to the weak electricity unit 70 as a signal isolated by associated one of photocoupler elements 341 of the inverter drive circuits 34. The excessive current protection signal S2 is obtained by connecting the elements 341 of the respective inverter drive circuits 34 in a wired OR relationship, so that, even when an excessive current is generated in one of the power switching elements 310, the protection signal S2 is generated. Power to each of the inverter drive circuits 34 is supplied from associated one of the power supplies 39.

Figure 3:
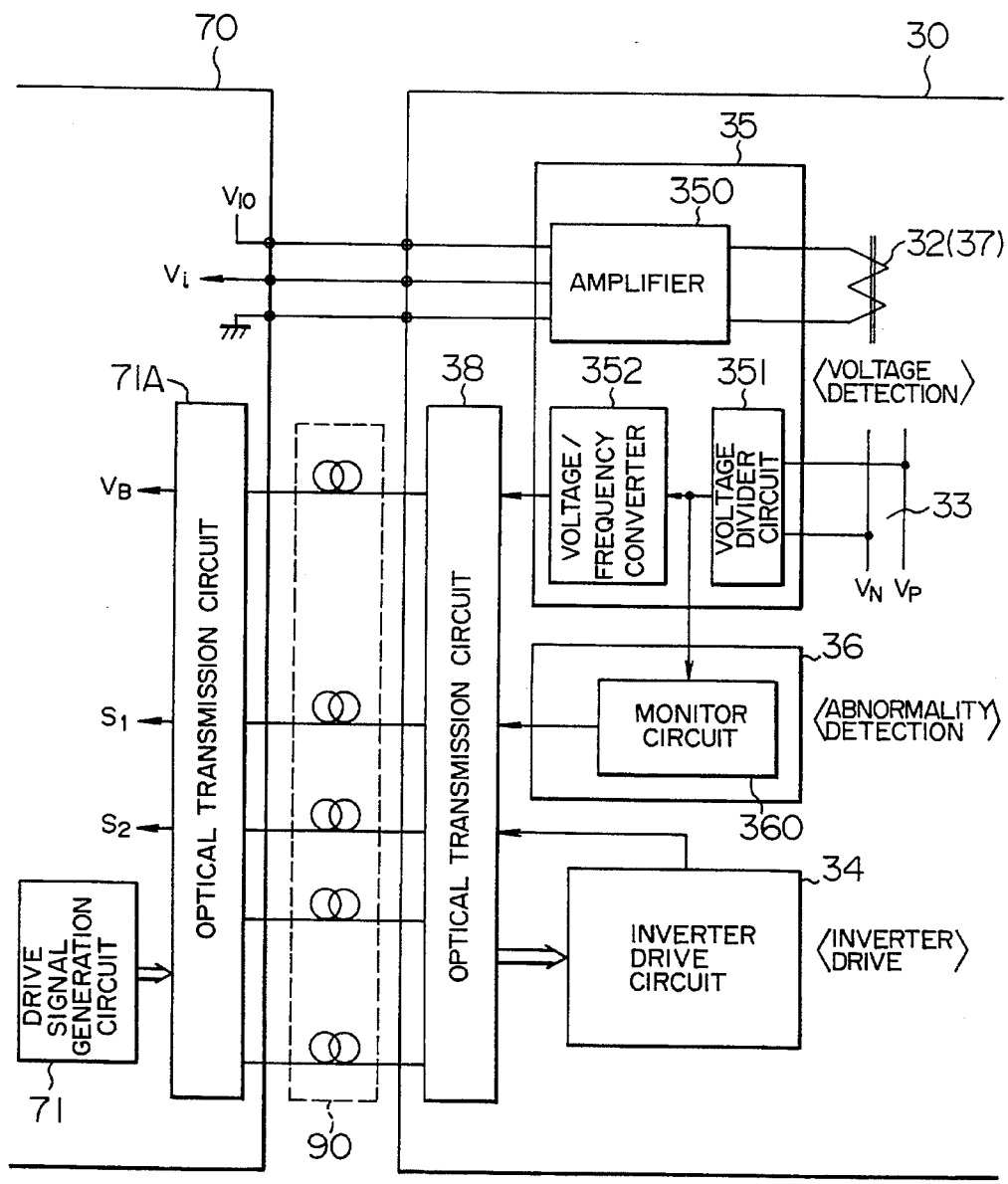
FIG. 3 is a block diagram showing another interconnection relationship between the strong and weak electricity units in the control system of the embodiment of FIG. 1.

The foregoing explanation has been made in connection with the case where signals between the strong and weak electricity units 30 and 70 are connected by means of wiring lines in FIG. 2 as an example. However, when the current detection signal of the sensor which in turn is isolated as well as signals (not shown) other than the temperature signal which require isolation circuits based on photocoupler elements are transmitted through such an optical transmission line 90 as an optical fiber cable as shown in FIG. 3, the resistance of the system to noise can be further increased. In FIG. 3, an optical transmission circuit 38 is made up of the insulation circuits 353 and 361 with respect to the voltage detection signal VB and abnormality detection signal S1, the isolating parts of the photocoupler elements 341 of the inverter drive circuits 34 with respect to the excessive current protection signal S2, and the isolating parts of the photocoupler elements 340 for receiving the drive signals of the inverter drive circuits 34. The optical transmission circuit 38 in the strong electricity unit 30 converts into an electrical signal an optical signal received from the optical transmission line 90. The weak electricity unit 70 includes an optical transmission circuit 71A which converts an input electrical signal into an optical signal to be sent to the optical transmission line 90. Each of the optical transmission circuits 38 and 71A has an isolating function based on the signal conversion.

As has been explained in the foregoing, since the strong electricity unit 30 is provided as separated from the weak electricity unit 70, the noise resistance of the control system can be enhanced. Further, for the purpose of reducing or suppressing generation of noise, the length of wiring lines between the strong electricity unit 30 and motor 50 is minimized. To this end, the strong electricity unit 30 is positioned in the vicinity of the motor 50 disposed in a front part 110 and/or rear part 130 of a car body 100. In an example of FIG. 4, the motor 50 is disposed in the front part 110, i.e., in a motor chamber; while the rear part 130 is used as a trunk chamber. Since the weak electricity unit 70, which contains the microcomputer 36 as its main constituent component, is made smaller in size than the strong electricity unit 30, the weak electricity unit 70 can be housed in a space 140 in front of and/or in the rear of and/or in a side of a driver's cab 120 as close to the strong electricity unit 30 as possible (in the space in front of the driver's cab, in the example of FIG. 4). In this connection, even when a plurality of such motors (one for each of the front and rear spaces) and thus a plurality of such strong electricity units are provided, the weak electricity units may be provided in a common space, for example, in the middle space of the car body. In this way, the strong and weak electricity units 30 and 70 can be disposed in an effective space of the car body 100.

What is claimed is:

1. A control system for an electric car, comprising:

a motor connected to a battery as a main power source for driving the electric car;

a high voltage apparatus including an inverter for outputting a driving output for driving said motor based on power supplied thereto from said battery, said high voltage apparatus outputting data for controlling said inverter;

a low voltage apparatus, connected to said high voltage apparatus through a signal path, including a microcomputer for processing said data supplied from said high voltage apparatus through said signal path in order to output a calculation result for controlling said inverter, said low voltage apparatus outputting a drive signal to said high voltage apparatus through said signal path for controlling said inverter based on said calculation result;

connection means for connecting said high and low voltage apparatuses through said signal path in such a manner that said signal path is connected between said high and low voltage apparatuses in an electrically isolated state;

wherein signal transmission between said high and low voltage apparatuses is carried out using signals electrically isolated between these apparatuses; and wherein said inverter is controlled in accordance with said drive signal sent from said low voltage apparatus through said signal path.

2. An electric car control system as set forth in claim 1, wherein said connection means includes insulation circuits which are provided in said high voltage apparatus and are connected to said signal path.

3. An electric car control system as set forth in claim 1 wherein said signal path is an optical transmission line, and said connection means includes optical transmission lines provided in said high and low voltage apparatuses respectively and are connected to said signal path.

4. An electric car control system as set forth in claim 1 further comprising means for housing therein said high and low voltage apparatuses, respectively, separately.

5. An electric car control system as set forth in claim 4, wherein said low voltage apparatus has a drive signal generation circuit for generating a drive signal for said inverter based on said calculation result from said microcomputer and transmitting said drive signal to said high voltage apparatus through said signal path and said connection means.

6. An electric car control system as set forth in claim 4, wherein said high voltage apparatus has an inverter drive circuit for driving said inverter based on said drive signal from said high voltage apparatus, detectors for detecting at least one of input/output currents and voltages of said inverter, a processing circuit for processing outputs of said detectors and outputting a result of the processing to said microcomputer as a part of said data, and an abnormality detection circuit for detecting an abnormality in said inverter on the basis of said result of the processing from said processing circuit and outputting a result of detection to said microcomputer as a part of said data.

7. An electric car control system as set forth in claim 6, wherein said processing circuit has a converter for converting an output voltage of said detectors into a frequency signal corresponding to said output voltage, and said connection means has an insulation circuit which is provided in said high voltage apparatus for providing an output of said converter to said signal path in an electrically isolated condition.

8. An electric car control system as set forth in claim 6, wherein said abnormality detection circuit has a monitor circuit for detecting an abnormality in said inverter on the basis of the detection values of said detectors, and said connection means has an insulation circuit which is provided in said high voltage apparatus for providing an output of said monitor circuit to said signal path in an electrically isolated condition.

9. An electric car control system as set forth in claim 4, wherein said high voltage apparatus is provided in a front and/or rear part of said electric car as close to said motor, and said low voltage apparatus is provided in a space in front of and/or at the rear of and/or at a side of a driver's cab of said electric car.

10. A control system for an electric car, comprising:

a motor connected to a battery as a main power source for driving the electric car;

a high voltage unit including an inverter which outputs a drive output for driving said motor based on power supplied thereto from said battery, the high voltage unit providing a data output;

a low voltage unit, connected to the high voltage unit through a signal path, including a microcomputer for processing the data supplied from the high voltage unit in order to control the inverter, the low voltage unit providing a drive signal output for the inverter to the high voltage unit through the signal path;

connection means for connecting said high and low voltage units through the signal path in such a relationship that the signal path is connected between the units in an electrically isolated state;

wherein signal transmission between said high and low voltage units is carried out with use of the signals isolated between the units; and wherein said high voltage unit has an inverter drive circuit for driving said inverter, detectors for detecting at least one of input/output currents and voltages of said inverter, a processor circuit for processing outputs of said detectors, and an abnormality detection circuit for detecting an abnormality in said inverter on the basis of detection values of said detectors.

11. An electric car control system as set forth in claim 10, wherein said processor circuit has a converter for converting an output voltage of said detectors into a frequency signal, and said connection means has an insulation circuit which is provided in said high voltage unit for providing an output of said converter to said signal path in an electrically isolated condition.

12. An electric car control system as set forth in claim 10, wherein said abnormality detection circuit has a monitor circuit for detecting an abnormality in said inverter on the basis of the detection values of said detectors, and said connection means has an insulation circuit which is provided in said high voltage unit for providing an output of said monitor circuit to said signal path in an electrically isolated condition.

\* \* \* \* \*